United States Patent
Hsieh et al.

(10) Patent No.: US 7,447,870 B2
(45) Date of Patent: Nov. 4, 2008

(54) DEVICE FOR IDENTIFYING DATA CHARACTERISTICS FOR FLASH MEMORY

(75) Inventors: Jen-Wei Hsieh, Taipei (TW); Li-Pin Chang, Banciao (TW); Tei-Wei Kuo, Taipei (TW); Hsiang-Chi Hsieh, Sindian (TW)

(73) Assignee: Genesys Logic, Inc., Taipei (TW)

( * ) Notice: Subject to any disclaimer, the term of this patent is extended or adjusted under 35 U.S.C. 154(b) by 205 days.

(21) Appl. No.: 11/452,195

(22) Filed: Jun. 14, 2006

(65) Prior Publication Data
US 2007/0016756 A1 Jan. 18, 2007

(30) Foreign Application Priority Data
Jul. 15, 2005 (TW) ............................. 94212102 U

(51) Int. Cl.
*G06F 12/00* (2006.01)
(52) U.S. Cl. .................. 711/216; 711/103; 711/219; 365/185.33; 365/240
(58) Field of Classification Search ............... 711/103, 711/216, 221, 219; 365/185.33, 240
See application file for complete search history.

(56) References Cited

U.S. PATENT DOCUMENTS 6,014,733 A * 1/2000 Bennett ............... 711/216
6,408,374 B1 * 6/2002 Calamvokis et al. ...... 711/216
7,290,084 B2 * 10/2007 Miller et al. ............. 711/108

* cited by examiner

Primary Examiner—Jasmine Song
(74) Attorney, Agent, or Firm—Rosenberg, Klein & Lee

(57) ABSTRACT

A highly efficient data characteristic identification device for flash memory is provided, including an instruction register, a plurality of auxiliary controllers, a data register, an address register, a microprocessor, a plurality of hash function units, a hash table unit, a comparator, a shifter, and an adder. By connecting the instruction register, data register and address register to a flash memory access control circuit and flash memory for storing the control instruction of the access control circuit and the data and physical and logical address of the flash memory, the control instruction is decoded and transmitted by the microprocessor and the auxiliary controllers to each circuit. A plurality of hash function units, a hash table unit, a comparator, a shifter, and an adder form an index computation circuit for flash memory LBA. By using the index and computation on the contents of the hash function units, the data characteristics of the LBA can be stored with less memory and higher efficiency. Therefore, the object of a highly efficient data access characteristic identification device for flash memory is provided.

4 Claims, 5 Drawing Sheets

DEVICE FOR IDENTIFYING DATA CHARACTERISTICS FOR FLASH MEMORY

BACKGROUND OF THE INVENTION

1. Field of the Invention

The present invention relates to a device for efficient identification of data characteristics for flash memory and, more particularly, to a device having a plurality of hashing units to efficiently identify the characteristics of the data stored in logical block address, applicable to data access to flash memory.

2. The Related Arts

The flash memory is widely used in storing multimedia data, such as digital images or audio data. However, during the access process, the conventional flash memory requires a plurality of logical block addresses (LBA) to store the system storage time of the flash memory to provide the data update time of the stored data to the flash memory access control circuit on the devices, such as digital camera, cell phone, card reader or computer, for file editing and management. Therefore, the frequency of data update and related state information is an important identification parameter for the flash memory access control.

There are two conventional methods to identify how often the data in flash memory is updated. The first method, as disclosed in the paper by M. L. Chiang, Paul C. H. Lee, and R. C. Chang, "Managing Flash Memory in Personal Communication Devices," ISCE, 1997, December (pp. 177-182), is to maintain a large array for storing the last access time of all the LBA that the system can possibly access. When the system receives a new write request, the current system time is compared with the last access time of the LBA. If the difference between the two is within a system-defined range, the data is identified as being frequently updated; otherwise, the data is identified as being infrequently updated. The drawback of this method is that it uses a large amount of memory. For example, for a 512 M bytes flash memory, with 512-bytes as an access unit, there will be 1,048,576 LBA for access. If four bytes are required for storing a time unit, this method requires 4M bytes for storing the time information.

The second method, as disclosed by L. P. Chang and T. W. Kuo, "An Adaptive Striping Architecture for Flash memory Storage Systems of Embedded Systems," 8th IEEE RTAS, September 2002 (pp. 187-196), is to use two linked lists to record the recently accessed LBA. The first linked list is a hot list, with each node of the hot list storing an LBA whose data is frequently updated. The second list is a candidate list, which is an under-study of the first list. To save the memory, the length of each list is restricted. For example, the first list has 512 nodes, and the second list has 1024 nodes. When the system receives a write request, the system first checks whether the corresponding LBA is in the hot list. If so, the LBA is identified as being frequently updated, and the corresponding node for the LBA is moved to the head of the hot list. Otherwise, the LBA is identified as being infrequently updated, and is checked to determine whether it is in the candidate list. If the LBA is in the candidate list, the corresponding node is added to the head of the hot list, and if the hot list is full, the last node of the hot list is moved to the head of the candidate list. If the LBA is not in the candidate list, the LAB is stored in a new node and the new node is added to the head of the candidate list, and if the candidate list is full, the last node of the candidate list is removed.

Although the second method consumes less memory than the first method, the drawback of the second method is that the execution time is unstable. This is because the system may find the node at the head of the first list, or may search the entire two lists without finding the node. This causes the unstable factor of the flash access and the CPU cycle to affect the overall efficiency of the flash memory usage.

SUMMARY OF THE INVENTION

The present invention is made to overcome the aforementioned drawbacks of the conventional methods. The primary object of the present invention is to provide a highly efficient data characteristic identification device for flash memory, comprising a plurality of hash function units, a hash table unit, a comparator, a shifter, and an adder forming an index computation circuit for flash memory LBA. By using the index and computation on the contents of the hash function units, the data characteristics of the LBA can be stored with less memory and higher efficiency.

Another object of the present invention is to provide a highly efficient data characteristic identification device for flash memory, comprising an instruction register, a plurality of auxiliary controllers, a data register, an address register, and a microprocessor. By connecting the instruction register, data register, and address register to a flash memory access control circuit and flash memory for storing the control instruction of the access control circuit and the data and physical and logical address of the flash memory, the control instruction is decoded and transmitted by the microprocessor and the auxiliary controllers to each circuit. The present invention is applicable to the flash memory access control devices of digital camera, card reader, PC, game box, and so on, to increase the efficiency of the flash memory.

To achieve the aforementioned objects, the present invention provides a highly efficient data characteristic identification device for flash memory, comprising an instruction register, a plurality of auxiliary controller, a data register, an address register, a microprocessor, a plurality of hash function units, a hash table unit, a comparator, a shifter, and an adder. By connecting the instruction register, the data register, and the address register to a flash memory access control circuit and flash memory for storing the control instruction of the access control circuit and the data and physical and logical address of the flash memory, the control instruction is decoded and transmitted by the microprocessor and the auxiliary controllers to each circuit. A plurality of hash function units, a hash table unit, a comparator, a shifter, and an adder form an index computation circuit for flash memory LBA. By using the index and computation on the contents of the hash function units, the data characteristics of the LBA can be stored with less memory and higher efficiency. Therefore, the object of a highly efficient data access characteristic identification device for flash memory is provided.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

Figure 1:
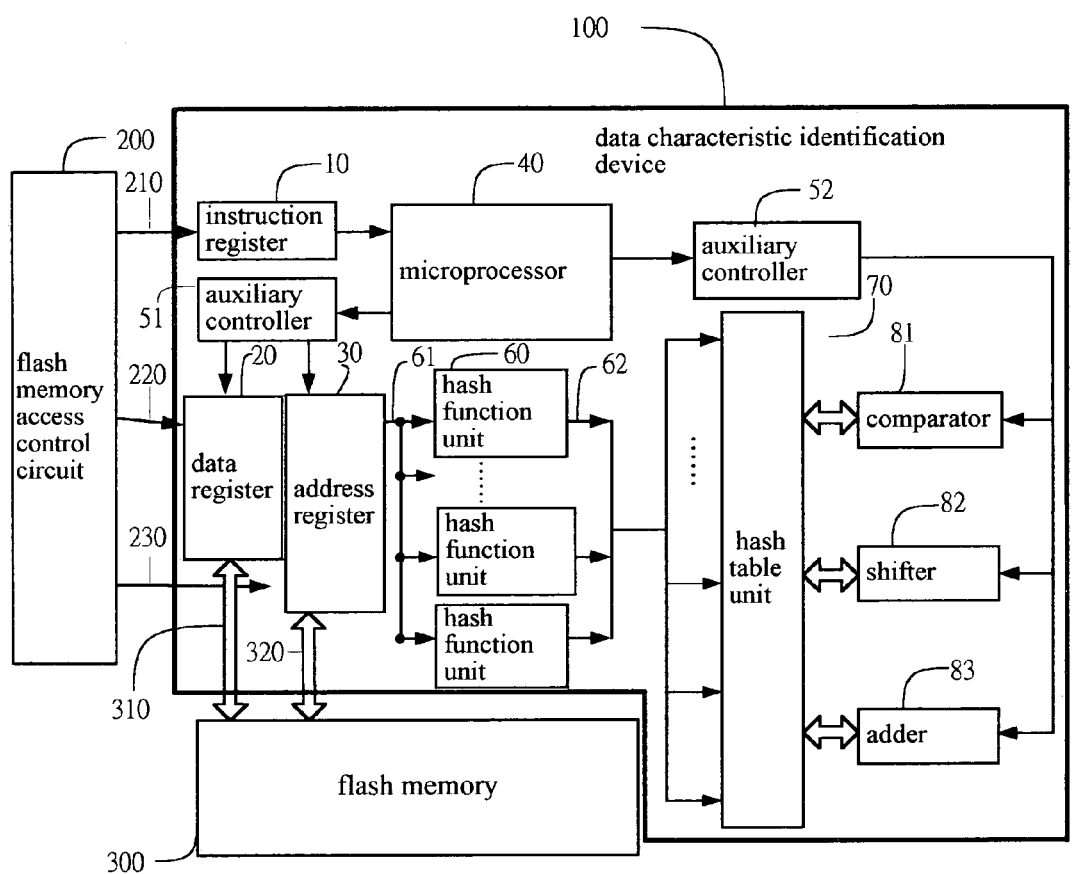
FIG. 1 is a system block diagram of the present invention.

With reference to the drawings and in particular to FIG. 1, which shows a system block diagram of a data characteristic identification device 100 for flash memory of the present invention, the device 100 comprises an instruction register 10, a data register 20, an address register 30, a microprocessor 40, a plurality of auxiliary controllers 51, 52, a plurality of hash function units 60, a hash table unit 70, a comparator 81, a shifter 82, and an adder 83. The instruction register 10 is connected to a control instruction end 210 of a flash memory access control circuit 200 for receiving high level data access control instruction issued from flash memory access control circuit 200. The flash memory access control circuit 200 is not limited to any specific type, and can be digital camera, card reader, cell phone, personal computer (PC), and so on, devices with flash memory access. The present invention uses card reader as an embodiment for description.

The data register 20 is connected to and placed between a data bus 220 of the flash memory access control circuit 200 and a data bus 310 of a flash memory 300 for storing data to be written to the flash memory 300 or data read from the flash memory 300.

The address register 30 is connected to and placed between an address bus 230 of the flash memory access control circuit 200 and an address bus 320 of a flash memory 300 for storing high level logical address of the flash memory access control circuit 200 or physical address of the access of flash memory 300.

The microprocessor 40 is connected to the instruction register 10 for receiving the high level data access control instruction to the flash memory 300 from the flash memory access control circuit 200, and acts as the core for data access control and program execution for the flash memory 300.

The auxiliary controllers 51, 52 are connected to the microprocessor 40 for assisting the microprocessor 40 in communicating with other elements. As shown in FIG. 1, the auxiliary controller 51 is connected between the microprocessor 40, and the data register 20 and the address register 30 so that the microprocessor 40 can communicate with the data register 20 and the address register 30 for data and address exchange.

Each hash function unit 60 has an input end 61 and an output end 62. The input end 61 is connected to the address register 30 for receiving the high level logical address of the flash memory access control circuit 200 for hash computation, and the output end 62 is for outputting the results of hash computation. The hash function unit 60 is not limited to any specific type. The present invention uses a combinatory circuit of the basic logical gates as an embodiment for description. Other equivalent single chip microprocessors are also within the scope of the present invention.

Figure 2:
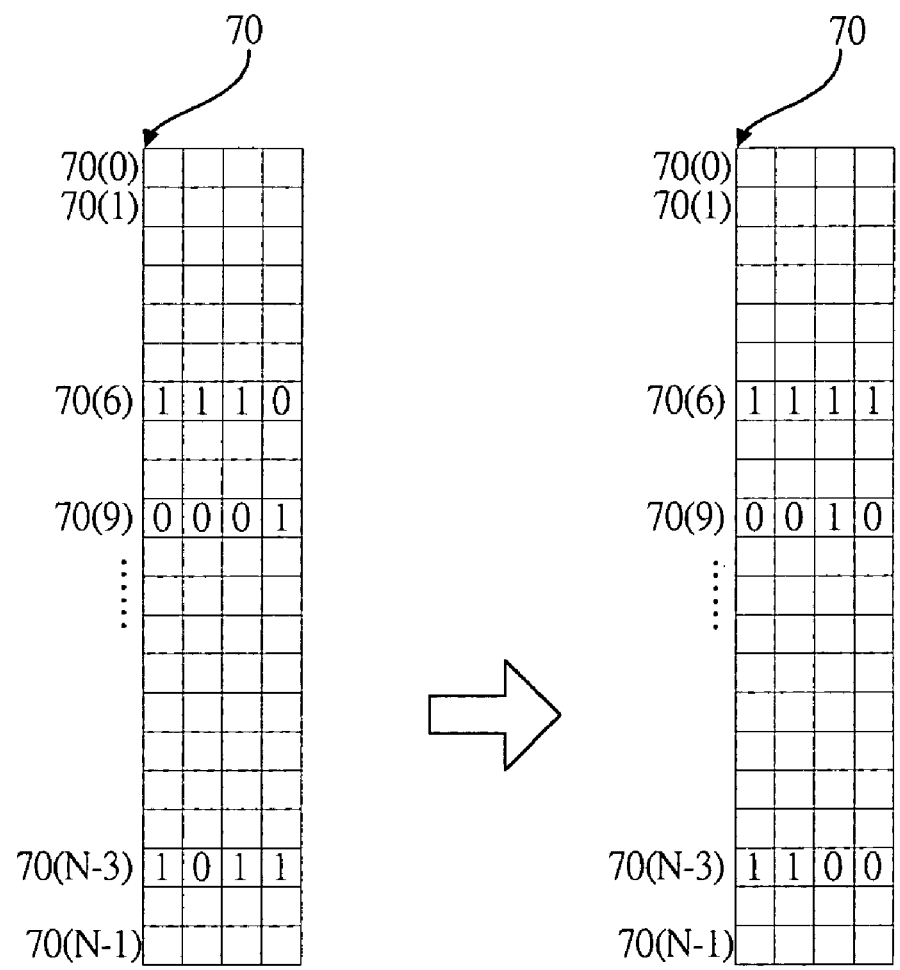
FIG. 2 is the first view of state change on the LBA computation of flash memory by hash function units, hash table unit, comparator, shifters, and adder.

The hash table unit 70 is connected to the output end 62 of each hash function unit 60. The hash table unit 70 is not limited to any specific type. The present invention uses a counter array as an embodiment for description. The hash table unit 70 comprises a plurality of counters 70(0)-70(N−1) forming a hash table, as shown in FIG. 2. Each counter 70(0)-70(N−1) is of four bits. Counters in the hash table corresponding to the output end 62 of the hash function unit 60 determine whether the data in a logical address is frequently updated.

The comparator 81, the shifter, 82 and the adder 83 are connected between the auxiliary controller 52 and the hash table unit 70. The comparator 81 is for determining the X most significant bits of a specific counter in the hash table of the hash table unit 70 being all zero in order to determine whether the data in the flash memory 300 is frequently updated.

The shifter 82 is for shifting the values in the counters 70(0)-70(N−1) of the hash table unit 70 one bit to the right, and filling the left most bit with zero.

The adder 83 is for adding 1 to the values in the counters 70(0)-70(N−1) of the hash table unit 70.

The hash function units 60, the hash table unit 70, the comparator 81, the shifter 82, and the adder 83 form a hash computation circuit, which can also be implemented as a single IC. Alternatively, the instruction register 10, the data register 20, the address register 30, the microprocessor 40, the auxiliary controllers 51, 52, and the hash function units 60, the hash table unit 70, the comparator 81, the shifter 82, and the adder 83 can be integrated into a single IC to be used in card reader or other devices with flash memory access control.

FIGS. 2-5 show the views that the present invention performs the identification operation, computation and determination of the data update on the flash memory 300. The following embodiment shows how the state update is performed. As shown in FIG. 2, when the microprocessor 40 receives a write request from the flash memory access control circuit 200, the hash function units 60, the hash table unit 70, the comparator 81, the shifter 82, and the adder 83 first perform state update. The state update includes the following steps. The logical address from the address register 30 is hashed by the hash function unit 60 to obtain the contents of the three counters 70(6), 70(9), 70(N−3), corresponding to the index, from the hash table of the hash table unit 70. Then, the next step is to check sequentially if the contents of the counters will overflow after adding 1. If the counter 70(6) will not overflow after adding 1, the contents of the counters 70(6), 70(9), 70(N−3) are added with 1 by the adder 83, and restored back to the counters.

Figure 3:
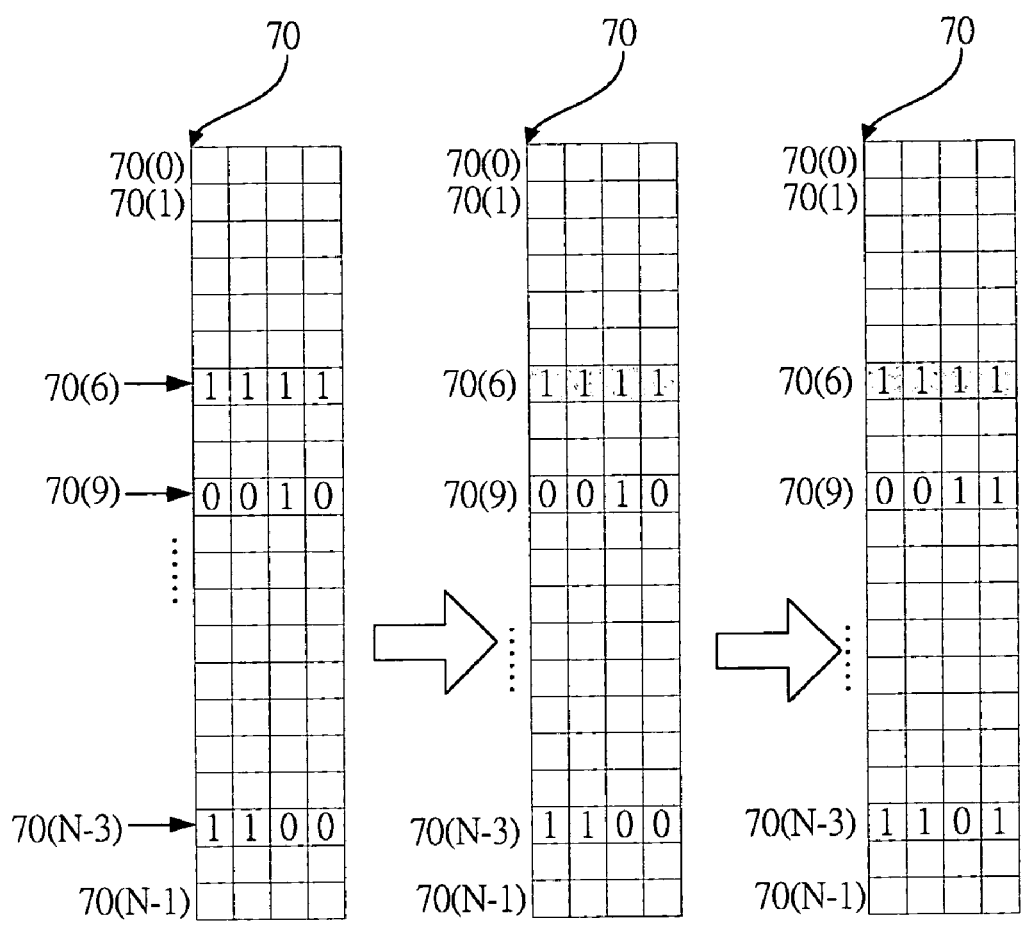
FIG. 3 is the second view of state change on the LBA computation of flash memory by hash function units, hash table unit, comparator, shifters, and adder.

As shown in FIG. 3, when the microprocessor 40 receives a state update instruction from the flash memory access control circuit 200, the hash function units 60, the hash table unit 70, the comparator 81, the shifter 82 and the adder 83 first perform state update. The state update includes the following steps. The logical address from the address register 30 is hashed by the hash function unit 60 to obtain the contents of the three counters 70(6), 70(9), 70(N−3), corresponding to the index, from the hash table of the hash table unit 70. Then, the next step is to check sequentially if the contents of the counters will overflow after adding 1. If the counter 70(6) will overflow after adding 1, but the counters 70(9), 70(N−3) will not overflow, the contents of the counter 70(6) stays the same, while the contents of the counters 70(9), 70(N−3) are added with 1 by the adder 83, and restored back to the counters.

Figure 4:
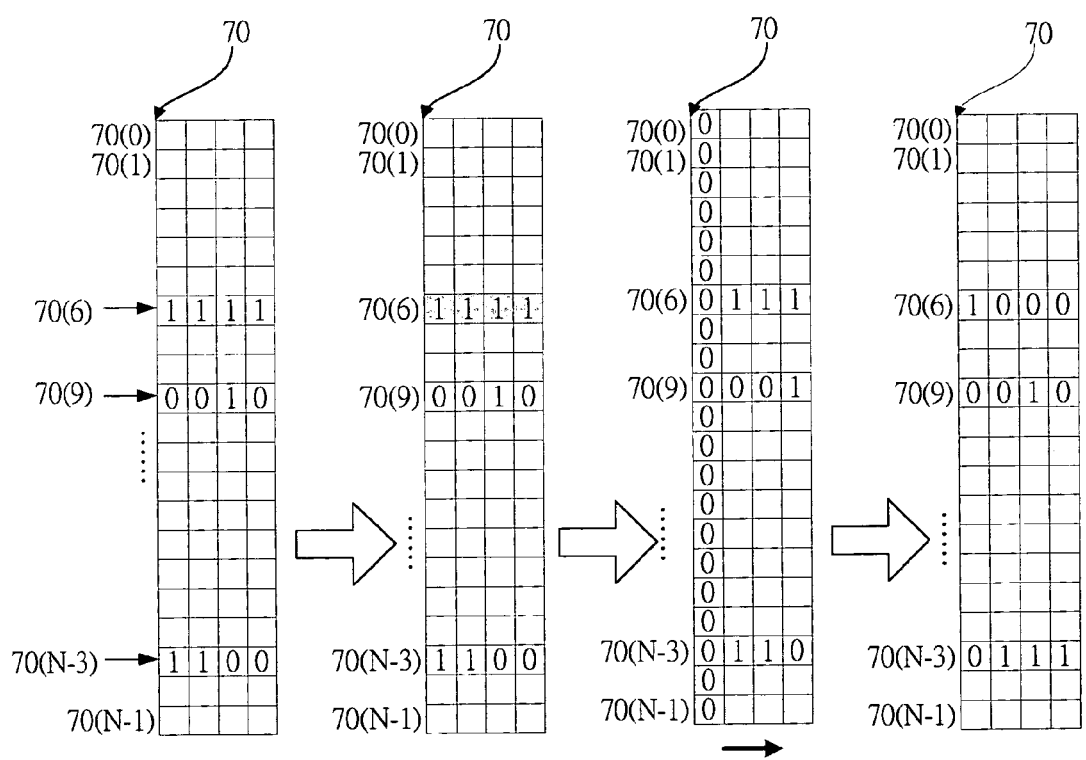
FIG. 4 is the third view of state change on the LBA computation of flash memory by hash function units, hash table unit, comparator, shifters, and adder.

As shown in FIG. 4, when the microprocessor 40 receives a state update instruction from the flash memory access control circuit 200, the hash function units 60, the hash table unit 70, the comparator 81, the shifter 82 and the adder 83 first perform state update. The state update includes the following steps. The logical address from the address register 30 is hashed by the hash function unit 60 to obtain the contents of the three counters 70(6), 70(9), 70(N−3), corresponding to the index, from the hash table of the hash table unit 70. Then, the next step is to check sequentially if the contents of the counters will overflow after adding 1. If the counter 70(6) will overflow after adding 1, but the counters 70(9), 70(N−3) will not overflow, all the counters 70(0)-70(N−1) in the hash table of the hash table unit 70 will be shifted to the right for 1 bit by the shifter 82, and the most significant bit is filled with a 0. Then, the contents of the counters 70(6), 70(9), 70(N−3) are added with 1 by the adder 83, and restored back to the counters.

Figure 5:
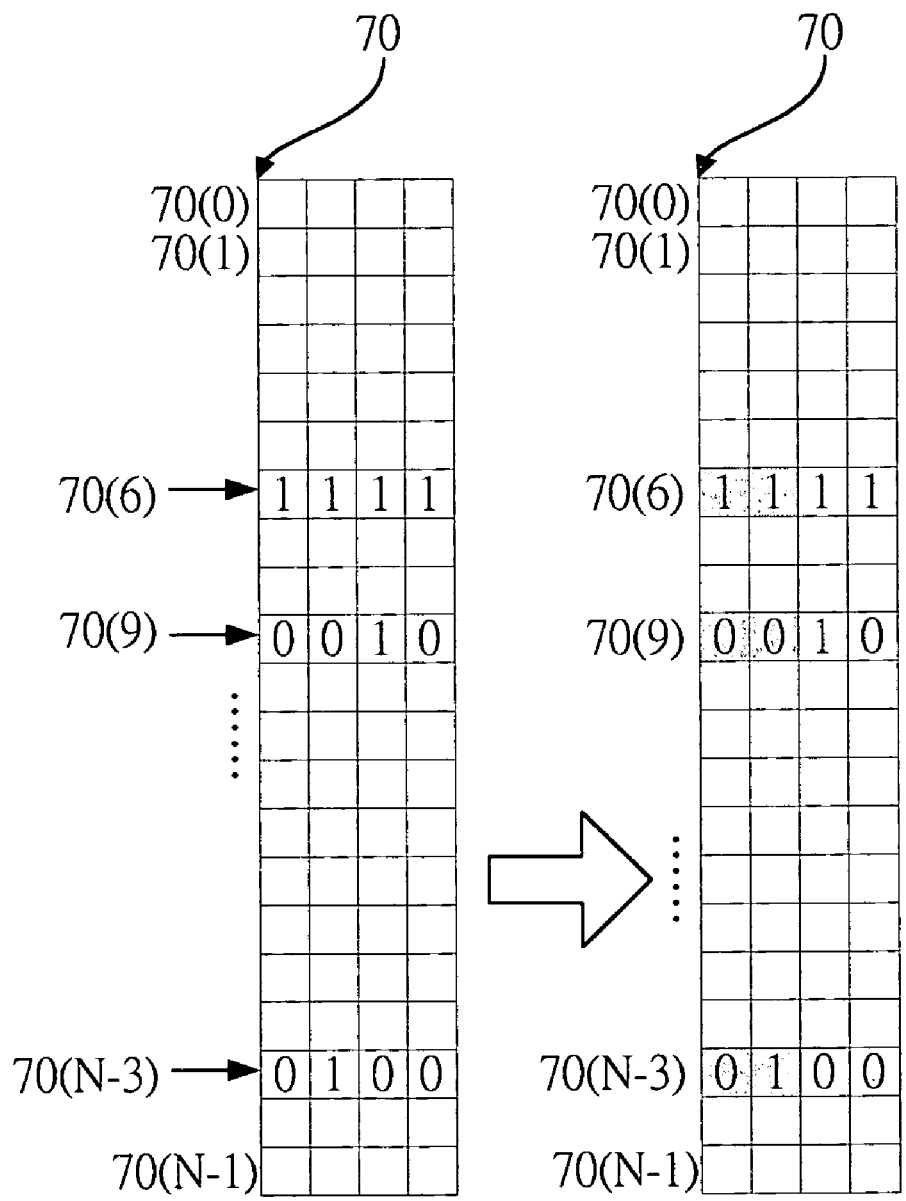
FIG. 5 is the view of data characteristic checking on data stored in the LBA of the flash memory by hash function units, hash table unit, comparator, shifters, and adder.

As shown in FIG. 5, when the microprocessor 40 receives a state update instruction from the flash memory access control circuit 200, the hash function units 60, the hash table unit 70, the comparator 81, the shifter 82 and the adder 83 first perform state update. The state update includes the following steps. The logical address from the address register 30 is hashed by the hash function unit 60 to obtain the contents of the three counters 70(6), 70(9), 70(N−3), corresponding to the index, from the hash table of the hash table unit 70. Then, the next step is for comparator 81 to check sequentially if the 2 most significant bits of the contents of the counters are not all-zero. If so, the data in the LBA is frequently updated; otherwise, the data in LBA is not frequently updated. As shown in FIG. 5, the 2 most significant bits of counter 70(9) are all zero; therefore, the data of the LBA in the flash memory 300 is considered as infrequently updated, and the final identification is performed by the microprocessor 40.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A device of data characteristic identification for flash memory, comprising:

an instruction register, connected to a control instruction end of a flash memory access control circuit for storing high level data access control instructions issued from the flash memory access control circuit;

a data register, connected between a data bus of the flash memory access control circuit and a data bus of a flash memory for storing data to be written to the flash memory or data read from the flash memory;

an address register, connected between an address bus of the flash memory access control circuit and an address bus of the flash memory for storing high level logical address of the flash memory access control circuit or physical address of access of the flash memory;

a microprocessor, connected to the instruction register for receiving the high level data access control instruction to the flash memory from the flash memory access control circuit, and acting as a core for data access control and program execution for the flash memory;

a plurality of auxiliary controllers, connected to the microprocessor for assisting the microprocessor in communicating with other elements, one of the auxiliary controllers being connected between the microprocessor, and the data register and the address register for data and address exchange between the microprocessor and the data register and the address register;

a plurality of hash function units, each hash function unit having an input end and an output end, the input end being connected to the address register for receiving the high level logical address of the flash memory access control circuit for a hash computation, and the output end for outputting the results of the hash computation;

a hash table unit, connected to the output end of each hash function unit, further comprising a plurality of counters forming a hash table, for an initial index from the output end of the hash function unit to find the corresponding counter in the hash table to determine whether data in a logical address being frequently updated;

a comparator, connected between one of the auxiliary controllers and the hash table unit, for determining several most significant bits of a specific counter in the hash table of the hash table unit being all zero in order to determine whether the data in the flash memory being frequently updated;

a shifter, connected between one of the auxiliary controllers and the hash table unit, for shifting values in the counters in the hash table of the hash table unit one bit to the right, and filling the left most bit with zero; and an adder, connected between one of the auxiliary controllers and the hash table unit, for updating by adding 1 to the values in the counters in the hash table of the hash table unit.

2. The device as claimed in claim 1, wherein the hash function unit is a combinatory circuit of basic logic gates.

3. The device as claimed in claim 1, wherein the hash function unit is a single chip microprocessor.

4. The device as claimed in claim 1, wherein the counter of the hash table unit is a four-bit counter.

* * * * *